United States Patent [19]
LeBreton

[11] 4,135,401
[45] Jan. 23, 1979

[54] TEMPERATURE MEASUREMENT SYSTEM FOR HOLLOW SHAFT INTERIORS

[75] Inventor: Albert F. LeBreton, Middletown, Pa.

[73] Assignee: Westinghouse Electric Corp., Pittsburgh, Pa.

[21] Appl. No.: 853,939

[22] Filed: Nov. 23, 1977

[51] Int. Cl.² ............ G01K 13/08; G01K 1/14
[52] U.S. Cl. .................... 73/351; 73/340; 138/108; 138/113
[58] Field of Search ............ 73/351, 340–341; 138/108, 113–114

[56] References Cited

U.S. PATENT DOCUMENTS

| | | | |
|---|---|---|---|
| 2,428,129 | 9/1947 | Smith | 73/351 |
| 3,331,247 | 7/1967 | Toepell | 73/351 |
| 3,417,785 | 12/1968 | Andrews | 188/108 |
| 3,619,612 | 11/1971 | Belke et al. | 73/351 X |
| 3,762,447 | 10/1973 | Holland | 138/113 |
| 4,004,219 | 1/1977 | Tiuri et al. | 73/351 X |

*Primary Examiner*—Charles Gorenstein
*Attorney, Agent, or Firm*—J. W. Keen

[57] ABSTRACT

A tubular element having structural members disposed thereon at selected axial locations for supporting thermocouples inside the bore of a hollow shaft. Each of the structural members constitutes a generally "X"-shaped configuration which is substantially divided in half to form separated sections. Thermocouples placed in the legs of each X-shaped structural member are biased into contact with the shaft's interior surface by spring members which are disposed in openings formed in both sections on opposite sides of the X member's division at low or zero speed and by the springs and centrifugal force at high speed. Relative axial movement of the sections constituting each X member is restrained by dowels set into the sections and across the space separating them. Wires from the thermocouples extend radially into and axially within the tubular member. At one axial end of the tubular member the thermocouple wires are connected to a rotatable transmitter which broadcasts signals received from those thermocouples. A remote, stationary receiver provides indications of signals broadcast by the transmitter. Such indications can be correlated with temperatures and thus provide continuous temperature measurement at any circumferential and axial position within the hollow rotatable shaft.

6 Claims, 3 Drawing Figures

TEMPERATURE MEASUREMENT SYSTEM FOR HOLLOW SHAFT INTERIORS

BACKGROUND OF THE INVENTION

This invention relates to rotatable, hollow shafts and more particularly to means for making temperature measurements at any point within the bore of the hollow shaft during shaft rotation.

Hollow shafts, when rotated, are subjected to centrifugal forces which cause stresses in the shaft which are highest near the shaft bore. Such hollow shafts are commonly used in machines such as steam turbines which often operate at elevated temperatures. The exterior of those shafts are commonly directly subjected to those elevated temperatures.

Shaft material temperature is substantially constant from its radially outer to its radially inner surface after the shaft's outer surface has been exposed to elevated temperatures for an extended period of time. During startup of the steam turbine or other device, however, the shaft's material temperature must be increased from near ambient to operating temperatures approaching 1,000° F. Commonly used startup procedures include gradually increasing the rotational velocity and turbine temperature by slowly incrementing motive fluid (steam) flow through the turbine and along the shaft's exterior. On initiating steam flow through the turbine the shaft's exterior surface temperature will be substantially equal to the motive fluid temperature while the hollow shaft's bore temperature will approach ambient as the turbine's shutdown time increases. Such temperature differences across the shaft's radial thickness promote thermal stresses in the shaft. Such thermal stresses when added to the stresses imposed by centrifugal loading of the shaft can, if left unchecked, result in mechanical failure. Temperature differentials and accompanying thermal stresses vary also with axial location within the turbine since steam temperatures decrease during the steam's axial traversal through the turbine. Knowledge of the inner shaft surface's temperature is highly desirable if optimal motive steam flow rates and temperatures are to be controlled during turbine startup so as to simultaneously provide safe and rapid turbine startups.

In the past, it was common practice to measure the steam temperature at the shaft's surface and, with the material properties of the shaft, calculate the shaft's inner surface temperature. The fracture toughness of the turbine shaft has been found to be a good indicator of the mechanical properties of the shafts and is a function primarily of temperature with the lower temperatures tending toward lower toughness. Since the inner surface of the shaft is always at the lowest temperature in the shaft, during a heating transient, the shaft's toughness in the region of its bore is lowest and therefore more susceptible to fracture. While the former technique for determining bore temperature is satisfactory, a confirmation of such calculated temperatures is desirable for the purpose of providing greater confidence in such calculations and in permitting shorter turbine startup times due to the greater certainty of measuring the bore temperature.

SUMMARY OF THE INVENTION

In general, a temperature measurement system, when made in accordance with the present invention, comprises a hollow, rotatable shaft which, within its inner void, houses a plurality of temperature sensing elements at selected axial and circumferential locations with those temperature sensing elements providing signals indicative of the shaft's inner surface temperature, means for transmitting the signals received from those sensing elements, and means for monitoring those transmitted signals at a location remote to the rotatable shaft.

Supporting devices for the temperature sensing elements are arranged about a spindle structure which extends axially through the shaft bore. A preferred embodiment of the present invention utilizes supporting structure for the temperature sensing elements which are generally X-shaped. The legs of the X-shaped structure house the temperature sensing elements and are separatable into individual structural sections. When assembled in operating position, the individual sections are biased against the shaft's inner surface by springs disposed between the sections with the sections' relative axial movement being restrained by dowel elements which are insertable into adjacent sections. The dowel elements and springs are disposed in a body portion of the structural sections and thus necessitate a substantially rectangular body section to minimize material used in the supporting structure. Electrical conductors connect the temperature sensing elements with the transmitting means by following a path from the legs of the X-shaped structure through the spindle wall, axially along the spindle's bore, and radially out one axial end of the spindle to the transmitting means.

BRIEF DESCRIPTION OF THE DRAWINGS

The objects and advantages of this invention will become more apparent from reading the following detailed description of a preferred embodiment taken in connection with the accompanying drawings in which corresponding reference characters indicate corresponding portions throughout the drawings and in which.

DESCRIPTION OF THE PREFERRED EMBODIMENT

Figure 1:
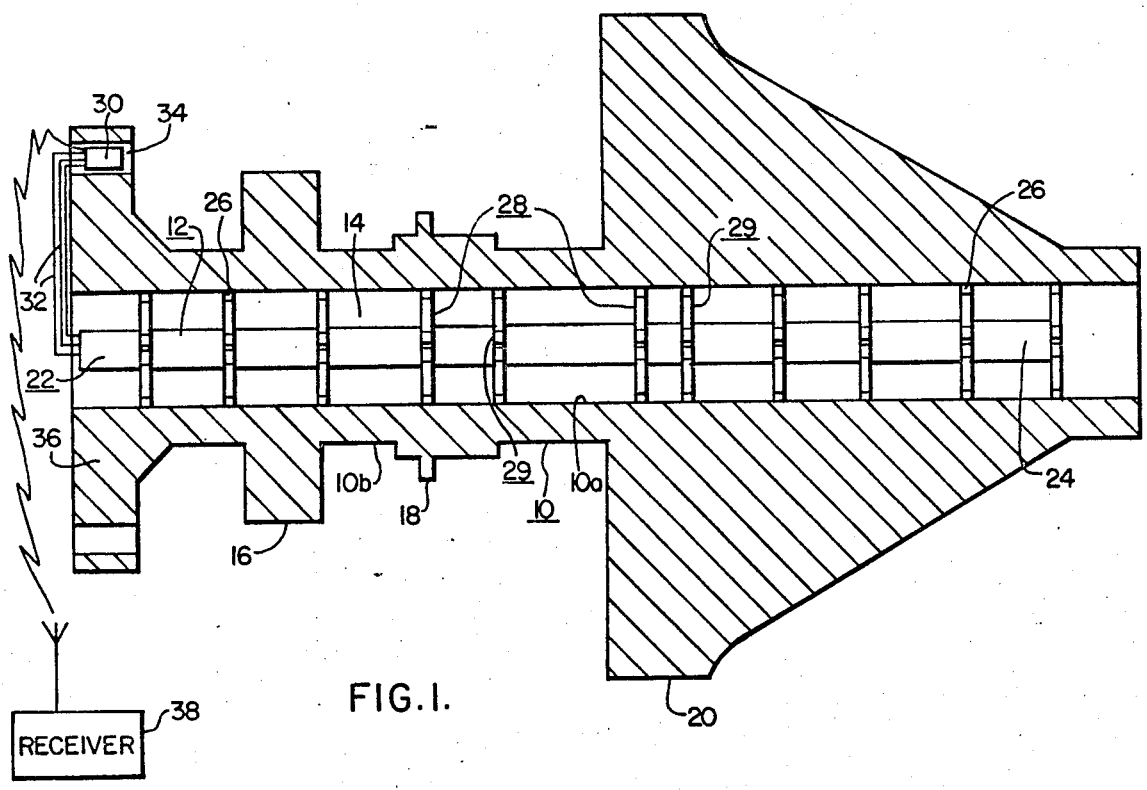
FIG. 1 is a partial sectional view of a steam turbine shaft with the present invention held therein in operating position.

Referring now to the drawings in detail, FIG. 1 illustrates a cross-sectional view of a turbine shaft 10 and a temperature measurement device 12 associated therewith. Shaft 10, since it is hollow, has inner surface 10a and outer surface 10b. Inner surface 10a bounds the shaft's void area or bore 14. The distance between outer surface 10b and the axis of rotation is seen to vary along the axial direction due to the presence of disc portions 16, 18 and 20 which support blades attached thereto. For purposes of the present invention, there may be more disc portions, less disc portions, or differently configured disc portions than are illustrated. Disposed within shaft bore 14 is a temperature measurement probe 22 which includes axially extending spindle 24, temperature measurement elements 26, and temperature measurement elements' supporting structure 28.

Temperature sensing elements 26 such as thermocouples produce signals which are indicative of the temperature of shaft surface 10a. Those signals are communicated to transmitter 30 through conductive wires 32 which pass radially inward from sensing element 26 to spindle 24 and then pass axially down spindle 24 to one axial end where they exit and extend radially outwards to transmitter 30. Transmitter 30 is shown disposed in bolt hole 34 of driving flange 36. Flange 36 provides means for coupling the particular turbine shaft to another turbine shaft or a load to be driven and the disposition of transmitter 30 in bolt hole 34 is only for convenience sake and is not a requirement of the present invention. Signals provided to transmitter 30 are broadcast thereby and received by monitoring means or receiver 38. Receiver 38 may have a direct temperature readout or provide an indication which can be correlated with a temperature.

Figure 2A:
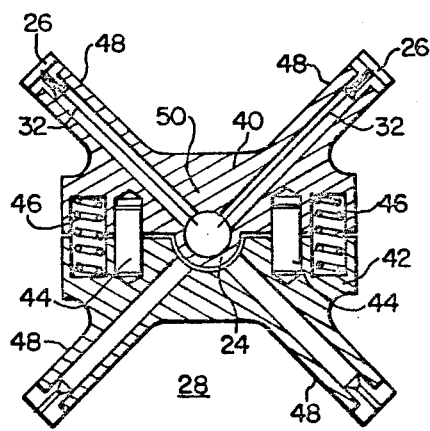
FIGS. 2A and 2B are sectional views of alternate temperature sensing supporting structures shown with the temperature sensing elements incorporated therein.

FIG. 2A is a sectional view of a temperature sensing element supporting structure 28. Supporting structure 28 is seen to constitute a generally X-shaped element which is separatable into structural sections 40 and 42 which are respectively the top and bottom halves of the element. Top section 40 has been welded or otherwise fixed to spindle 24 and lower section 42 is seen to be constrained in the same axial plane as section 40 by dowel pins 44. Sections 40 and 42 are biased against one another by biasing means or spring 46 by example such that the legs or spokes 48 are forced into contact with shaft inner surface 10a. Although thermocouples 26 could be disposed in each leg 48, they were chosen for insertion only in section 40 which is fixedly attached to spindle 22. Two legs 48 on each of the sections were chosen since one leg was judged to be insufficient in strength and three or more legs could result in some of the legs 48 failing to contact inside shaft surface 10a. The relatively rectangular shape of body portion 50 of the X-shaped supporting structure results from optimizing the quantity of material necessary to build supporting structure 28. Such rectangular shape is necessitated by the straight nature of spring 46 and dowels 44.

Figure 2B:
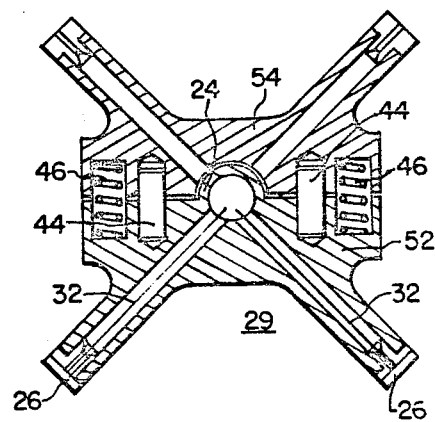

FIG. 2B illustrates another supporting structure 29 which has lower section 52 fixedly attached to spindle 22 rather than upper section 50 as in supporting structure 28. Lower section 52 is constrained by dowels 44 to occupy the same axial plane as does upper section 54. Supporting structures 28 and 29 are axially alternated along spindle 22 so as to provide a stable structure and thus reduce the chance for rotational imbalance.

It will now be apparent that an improved temperature measurement system has been provided which yields temperature indications at selected locations along the inside of a hollow shaft used in a turbine or other machine. Such temperature measurement system permits continuous monitoring of the various points on the shaft which are contacted by the system while avoiding the relative sliding contact commonly experienced by transmission means such as slip rings and their contacting brushes. Furthermore, the quantity of material chosen for each axial probe structure has been minimized and its contact with the surface in question has been assured by biasing the separate sections thereof against that surface. Actual temperature measurement of the turbine shaft's inside surface 10a permits confirmation of presently assumed heat transfer rates and provides greater turbine reliability while minimizing startup time.

I claim:

1. A temperature measurement system comprising:
    a rotatable shaft having an inner surface which bounds an axially extending void and an outer surface;
    a plurality of temperature sensing elements disposed within said void at predetermined axial and circumferential locations, said sensing elements providing signals which are indicative of the shaft's inner surface temperature at the predetermined axial and circumferential locations;
    a plurality of structural members which support said sensing elements, each of said structural members being situated within said void at one of said predetermined axial locations, each of said members including a plurality of structural sections and means for biasing at least a part of each structural section radially outward against said shaft's inner surface;
    means for transmitting said signals received from said sensing elements; and
    means for monitoring said transmitted signals.

2. The temperature measurement system of claim 1 wherein said structural sections have a main body portion situated about the shaft's axis of rotation and a plurality of biasable spoke members which extend from said main body portion toward said shaft's inner surface.

3. The temperature measurement system of claim 2 further comprising:
    a hollow spindle which extends axially through said structural members and has at least one section of each structural member attached thereto.

4. The temperature measurement system of claim 3, further comprising:
    signal carrying conductors connecting said temperature sensing elements and said transmitting means, said conductors passing therebetween through said spindle's interior.

5. The temperature measurement system of claim 2 wherein said body portion has a radially outer periphery relative to said axis of rotation which constitutes a series of substantially flat planes, each of said planes being disposed between two of said spoke members.

6. The temperature measurement system of claim 1, further comprising:
    means for constraining relative axial movement while permitting relative radial movement of the structural sections constituting each structural member.

* * * * *